(12) United States Patent
Hwang (10) Patent No.: US 6,301,424 B1
(45) Date of Patent: Oct. 9, 2001

(54) DISTRIBUTION FRAME CABLE ROUTING APPARATUS

(75) Inventor: Liang Hwang, Old Bridge, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/548,870

(22) Filed: Apr. 13, 2000

(51) Int. Cl.[7] ...................................................... G02B 6/00
(52) U.S. Cl. ............................ 385/135; 385/134; 385/137
(58) Field of Search .................................... 385/134–137, 385/147; 174/60, 64, 68.1, 48, 72 R; 379/327; 361/829

(56) References Cited

U.S. PATENT DOCUMENTS 4,053,719 * 10/1977 Debortoli et al. ...................... 179/98
5,825,962 * 10/1998 Walters et al. ........................ 385/135
6,160,946 * 12/2000 Thompson et al. ................... 385/134

* cited by examiner

Primary Examiner—Hemang Sanghavi
Assistant Examiner—Scott A Knauss
(74) Attorney, Agent, or Firm—David L. Davis (57) ABSTRACT

Apparatus for routing cables in a distribution frame. The apparatus includes a planar panel having takeup spools mounted thereon for the storage of excess lengths of cable. A hollow cylindrical member is mounted for pivoting movement about a pivot axis, where the longitudinal axis of the cylindrical member is parallel to the pivot axis. The cylindrical member has a longitudinally extending gap in its wall. Cables are routed to the panel, are selectively wound on selected ones of the spools to provide slack management, are routed into the cylindrical member, and are routed out of the cylindrical member through the gap.

8 Claims, 8 Drawing Sheets

DISTRIBUTION FRAME CABLE ROUTING APPARATUS

BACKGROUND OF THE INVENTION

This invention relates to distribution frames and, more particularly, to apparatus for routing cables in a distribution frame.

Modern high speed telecommunications equipment increasingly relies on the use of optical fiber as a transmission medium, since it provides the bandwidth needed by customers. However, the optical fiber cables must be handled with care to prevent optical losses. When an optical fiber is bent, micro-cracking may occur and damage the expensive fiber cables. It is therefore important to control the bend radius of the fiber. As a general rule, fiber handling and packaging is much more restrictive than wire handling and packaging.

As customers demand higher bandwidth, the communications service providers are interested in purchasing the most compact system that takes up the least amount of floor space. Accordingly, increasingly higher fiber counts are packaged into a limited space. To complicate matters, optical fiber organization always involves slack management for two reasons:

1) Fiber termination can yield length variation that dictates its manufacturing tolerance; and
2) It is desirable to have equal length fiber cables used for multiple equipment module locations.

To satisfy these constraints, it is known to use valuable space within the same bay frame or adding additional half width or full width bay frames to provide room for slack management. This is disadvantageous in that equipment space is always at a premium and adding additional bays takes up floor space. Further, using space in the same equipment bay is not always feasible since the same space is sought after for packaging active equipment. It would therefore be desirable to provide a cable management system which, in a limited amount of space, efficiently routes optical fiber cables, provides slack management, and routes the cables in a manner to minimize bending.

SUMMARY OF THE INVENTION

According to the present invention, there is provided apparatus for routing cables in a distribution frame which comprises a planar panel having a plurality of takeup spools with their axes aligned perpendicular to the plane of the panel for the storage of excess lengths of cable, and a hollow cylindrical member mounted for pivoting movement about a pivot axis. The longitudinal axis of the cylindrical member is parallel to the pivot axis and the cylindrical member has a longitudinally extending gap in its wall. Cables are routed to the panel, are selectively wound on selected ones of the spools to provide slack management, are routed into the cylindrical member, and are routed out of the cylindrical member through the gap.

BRIEF DESCRIPTION OF THE DRAWINGS

The foregoing will be more readily apparent upon reading the following description in conjunction with the drawings in which like elements in different figures thereof are identified by the same reference numeral and wherein.

DETAILED DESCRIPTION

Figure 1:
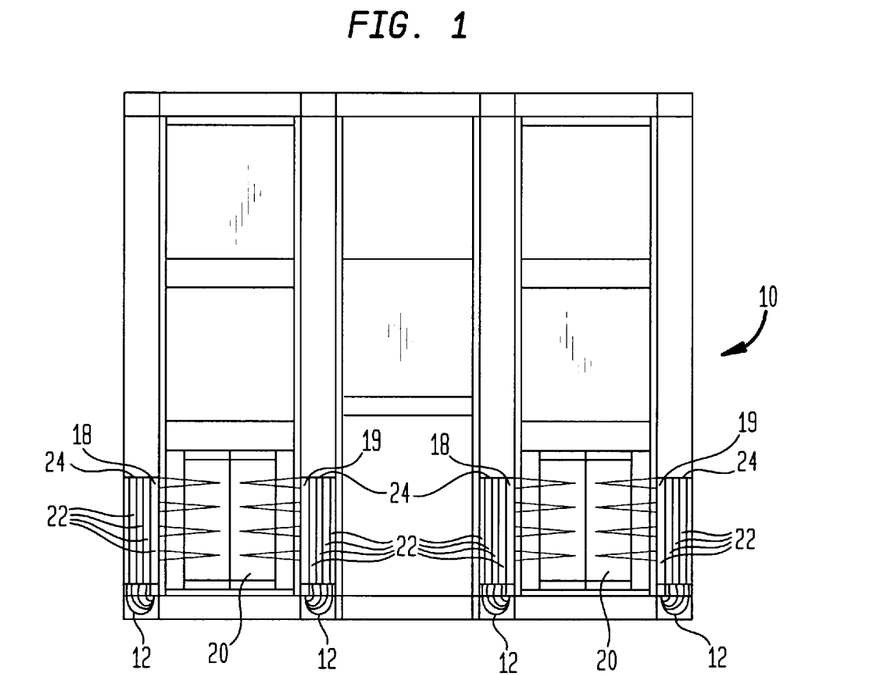
FIG. 1 is a schematic front view of a distribution frame incorporating the present invention.
Figure 2:
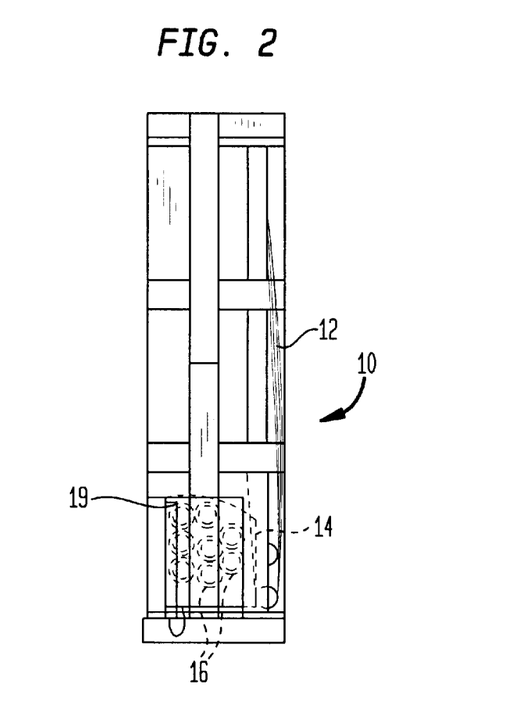
FIG. 2 is a schematic side view of the frame of FIG. 1.

Referring now to the drawings, FIGS. 1 and 2 schematically depict a distribution frame, designated generally by the reference numeral 10, in which optical fibers 12 are routed from near the top of the frame to panels 14 holding takeup spools 16 for slack management of the optical fibers 12. The fibers 12 are then routed to the cylindrical members 18 or 19, and finally to the connector panels 20.

Figure 3:
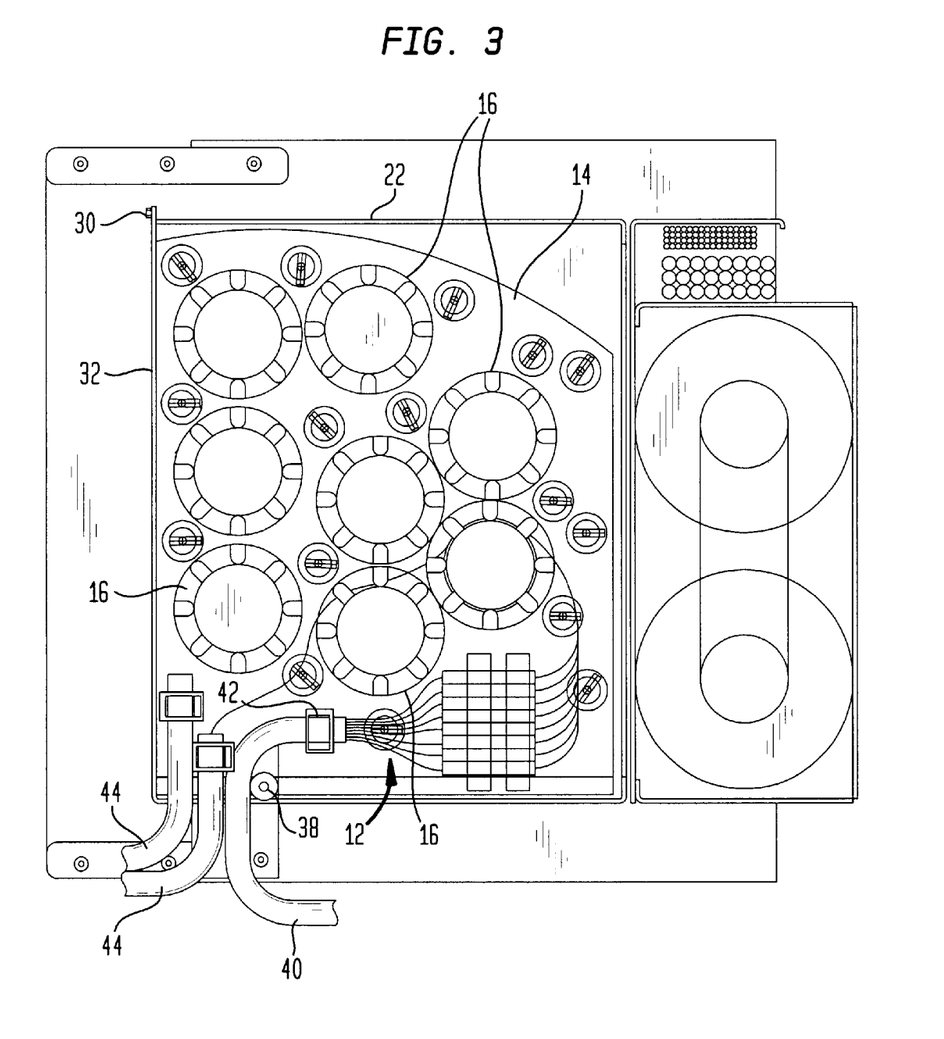
FIG. 3 is a side view illustrating a takeup spool panel according to the present invention in its storage position.
Figure 4:
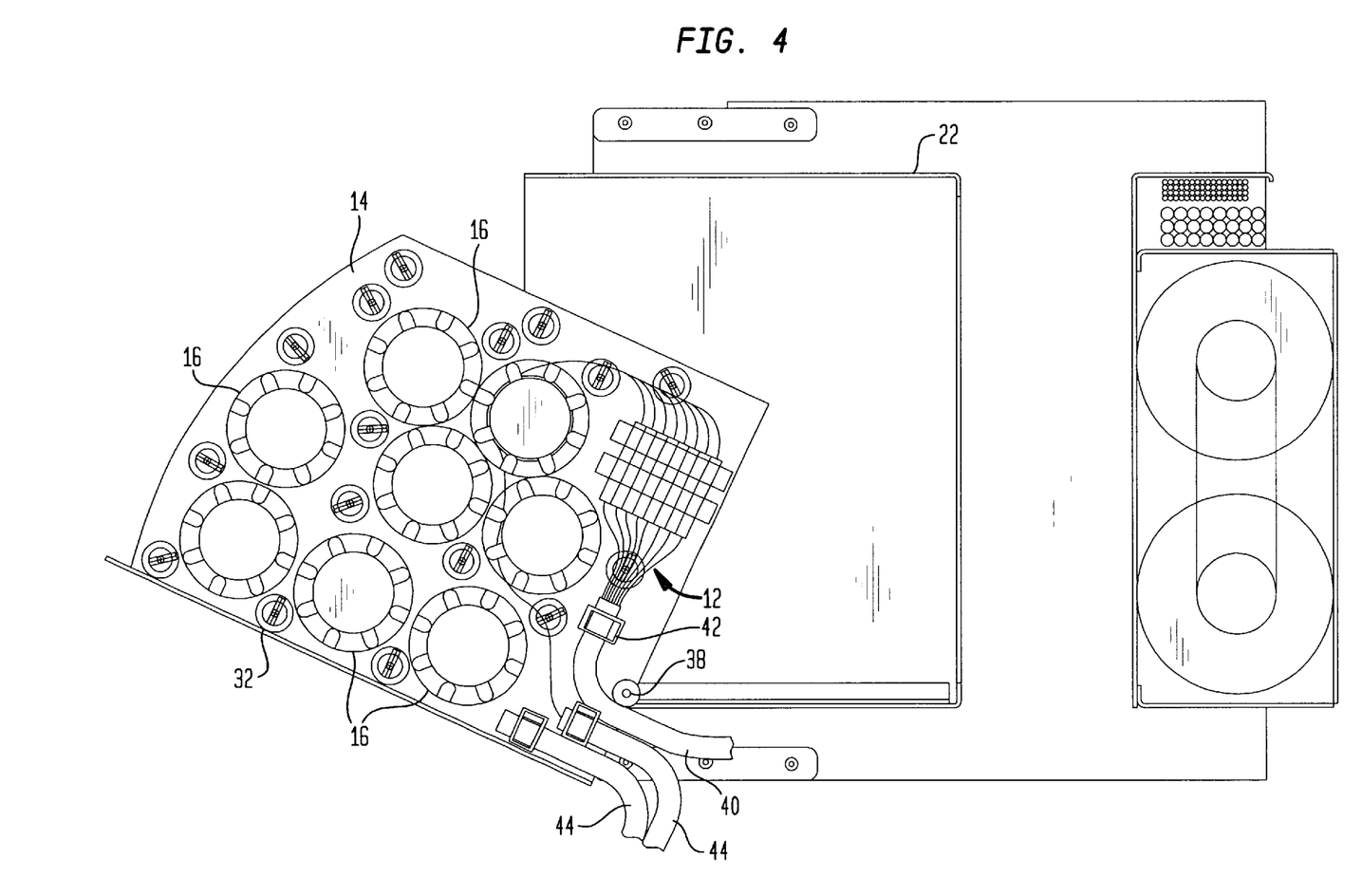
FIG. 4 is a view of the panel shown in FIG. 3 which has been slid out of its storage position and pivoted to provide full access thereto.
Figure 5:
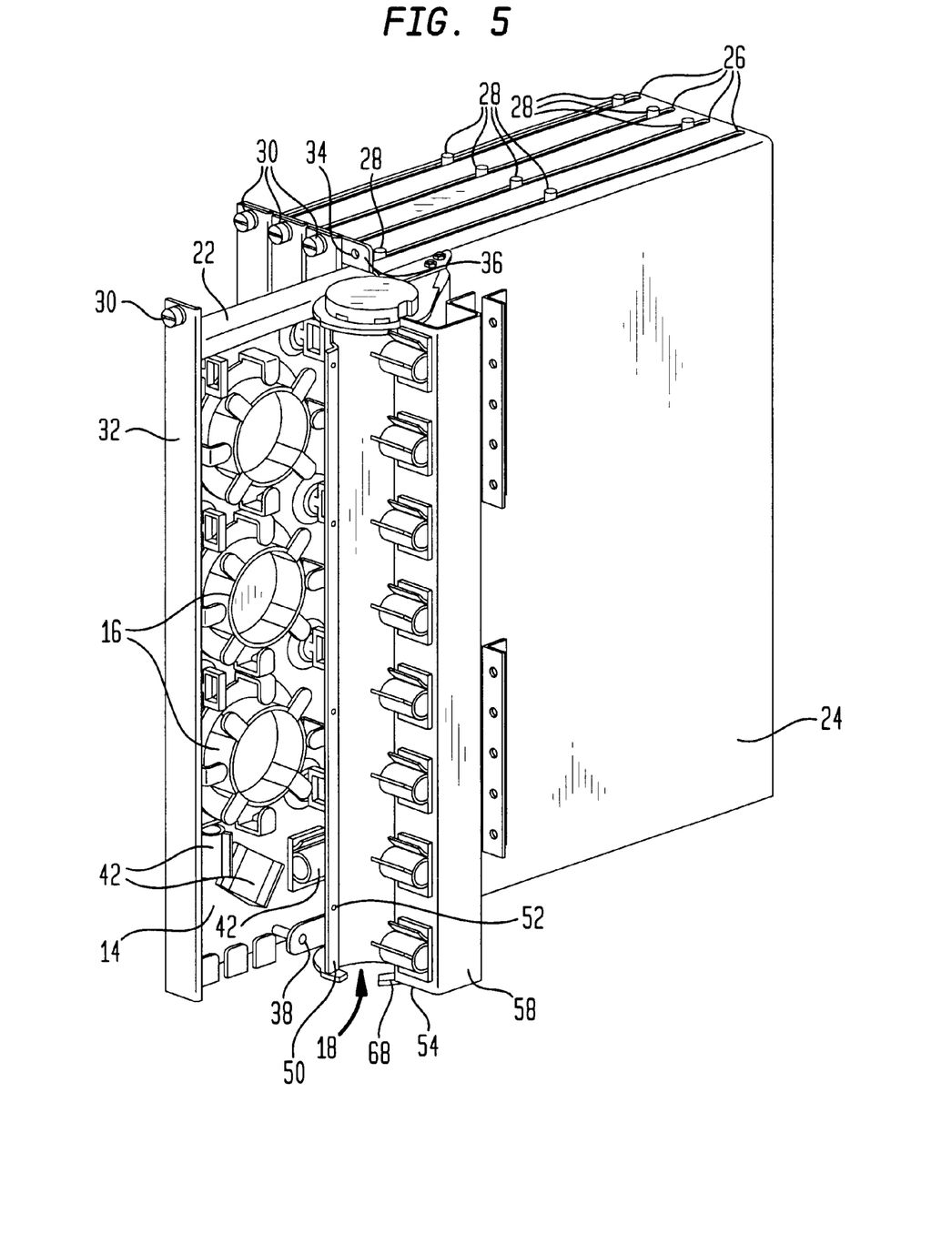
FIG. 5 is a perspective view showing the mounting of a plurality of the panels shown in FIGS. 3 and 4.

As shown in FIGS. 3, 4, and 5, each of the panels 14 is pivotably mounted to a tray 22. A group of four trays 22, each holding a respective pivotably mounted panel 14, is mounted inside an enclosure 24. The enclosure 24 is formed, in its top and bottom, with four parallel slots 26. A pair of posts 28 extends through each of the slots 26 and is secured to the top of a respective tray 22. The posts 28 and the slots 26 cooperate to guide the tray for sliding movement in and out of the enclosure 24, and to limit the travel of the tray 22 relative to the enclosure 24. To secure each tray 22 and its panel 14 within the enclosure 24, screws 30 are provided which extend through suitable openings in the front plate 32 of the panel 14 and are threaded into openings 34 of the upturned flange 36 at the front of the enclosure 24. This arrangement allows a panel 14 to be fully exposed by removing the screw 30, sliding the tray 22 out of the enclosure 24 as far as it will go, and then pivoting the panel 14 about its pivot 38, as best shown in FIG. 4.

As is clearly shown in FIGS. 3 and 4, the fibers 12 enter a tray 22 through a flexible conduit 40 which is secured to the panel 14 by a clip 42. The fibers 12 exit the conduit 40 and are routed to appropriate takeup spools 16 for slack management, and are then routed out of the tray 22 through either of the two exit conduits 44. Preferably, the conduits 40, 44 are of the type having a longitudinal slit so that the fibers 12 can be placed therein in a direction transverse to the longitudinal axis of the fibers.

Figure 6:
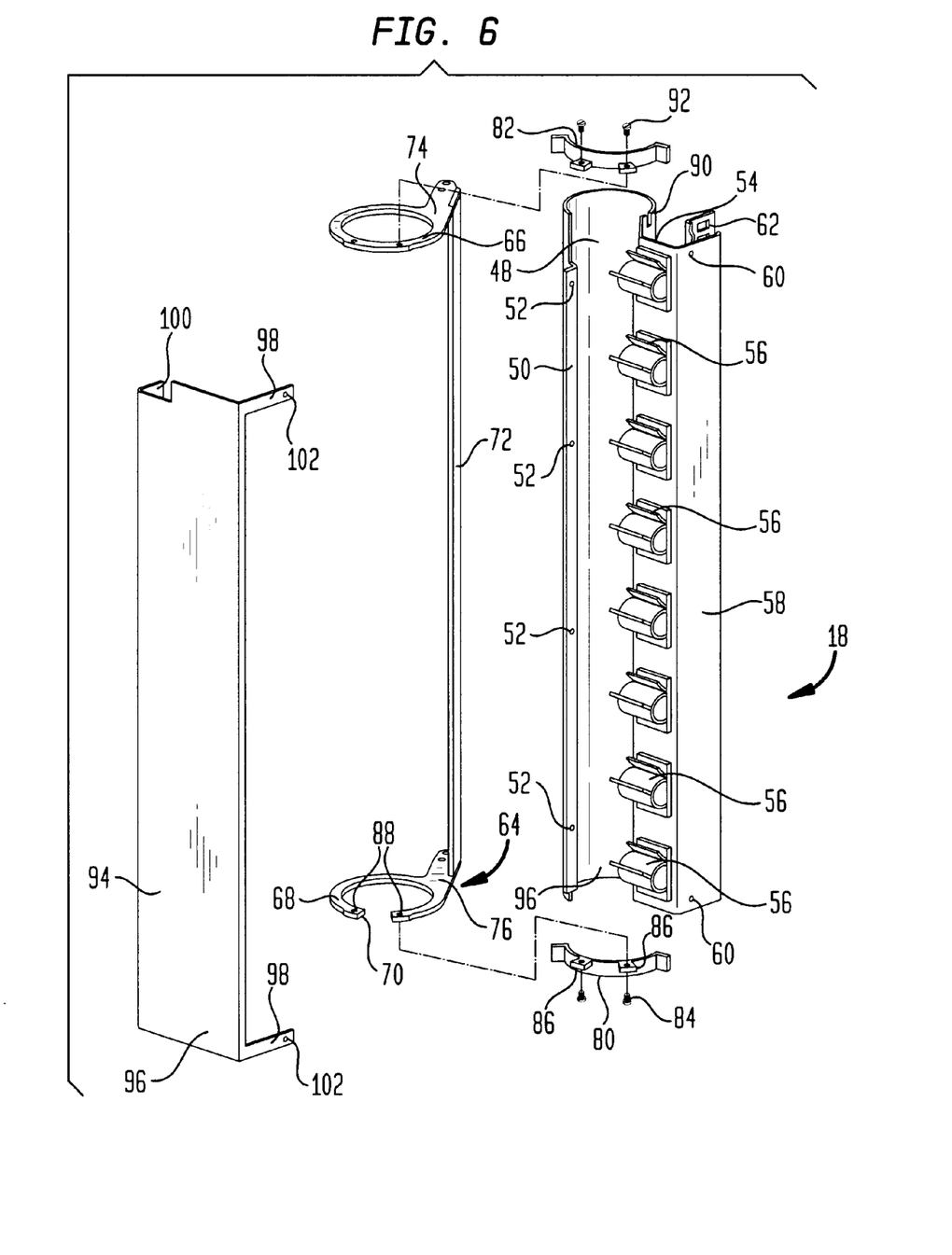
FIG. 6 is an exploded perspective view of the cable routing cylindrical member and its pivoting mounting bracket.
Figure 8:
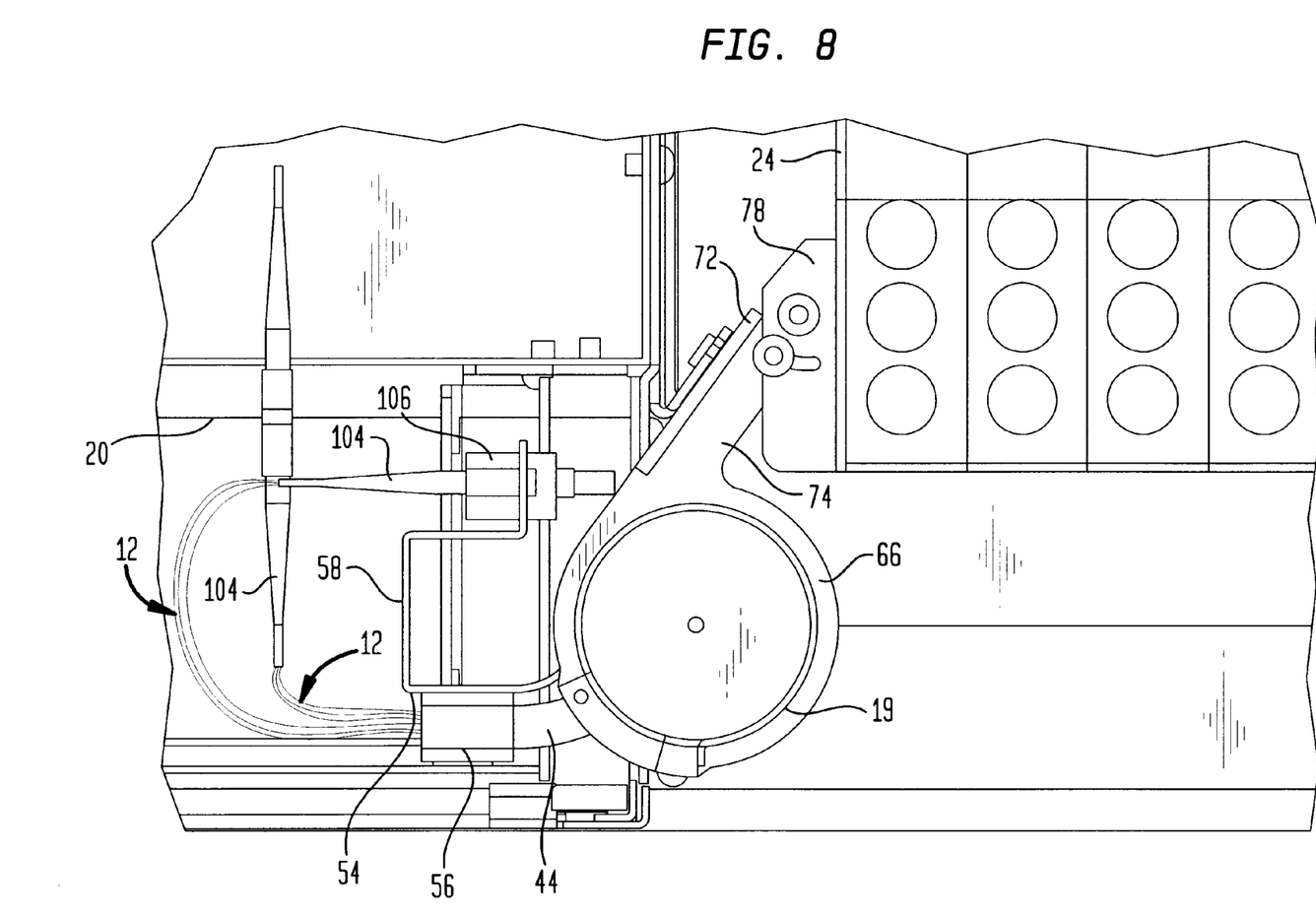
FIG. 8 is a top view with the cylindrical member in its use position.

A cylindrical member 18 or 19 is mounted adjacent each enclosure 24. As shown in FIG. 1, illustratively there is an enclosure 24 mounted along each side of each connector panel 20. The cylindrical members 18 or 19 mounted to opposite enclosures 24 are preferably mirror images of each other, and a detailed description of only the cylindrical member 18 follows. The mounting of each cylindrical member 18 is pivotable, as clearly shown in FIGS. 5 and 6. Thus, the cylindrical member 18 is preferably formed from sheet metal which is rolled and bent to form a hollow cylindrical portion 46 with a longitudinally extending gap 48 in its wall. Along one side of the gap 48, the cylindrical member 46 is formed with a relatively small plate portion 50 having spaced openings 52 whose purpose will be described hereinafter. Along the other edge of the gap 48, the cylindrical member 18 is formed with a plate 54 extending substantially radially outward from that edge of the gap 48. Mounted to the plate 48 is an array of guide members 56 each for holding a respective one of the exit conduits 44, as shown in FIG. 8. A further bent plate 58 is secured to the end of the plate 54, as by screws 60 or welding. The distal end of the bent plate 58 is formed with openings 62 (FIG. 6) for receiving therein "dummy" fiber connectors, as will be described.

To mount the cylindrical member 18, a bracket 64 is provided. The bracket 64 includes a pair of spaced circular rings 66, 68, with the ring 68 illustratively being formed with a gap 70. Connecting the rings 66, 68 is an elongated member 72. The rings 66, 68 and the elongated member 72 are preferably formed from sheet stock as a unitary structure. An extension 74 joining the ring 66 to the elongated member 72 and an extension 76 joining the ring 68 to the elongated member 72 are used to pivotably mount the bracket 64 to tabs 78 (FIG. 8) mounted to the enclosure 24.

To assemble the cylindrical member 18 along with the conduits 44, the bracket 64 is first mounted to the enclosure 24. The top of the cylindrical portion 46 of the cylindrical member 18 is then moved at an angle upwardly into the interior of the circular ring 66 until the tops of the plate portion 50 and the plate 54 abut against the ring 66. The bottom of the cylindrical portion 46 is then moved over the cylindrical ring 68 and dropped into the interior of the ring 68. The bottoms of the plate portion 50 and the plate 54 abut against the ring 68 and keep the cylindrical member 18 from falling therethrough. The conduits 44 are then placed transversely through the gap 48 into the interior of the cylindrical portion 46 and placed into the guide members 56. At this time it is noted that there are four trays 22 within each enclosure 24, each tray 22 having two conduits 44 exiting therefrom, for a total of eight conduits 44.

To hold the cylindrical member 18 in the bracket 64, a pair of retaining clips 80, 82 are provided, illustratively of identical construction. Preferably, the lower clip 80 is installed before the upper clip 82. The lower clip 80 is installed by sliding its ends into slots provided therefor at the lower end of the cylindrical portion 46 and installing the screws 84 through openings in the tabs 86 formed as part of the clip 80. The screws 84 are threaded into the openings 88 provided in the ring 68. Similarly, the clip 82 has its ends slid into the slots 90 at the upper end of the cylindrical portion 46 and screws 92 are used to secure the clip 82 to the ring 66. Thus, the cylindrical member 18 is prevented from moving longitudinally and rotatively.

A cover 94 is also provided. The cover 94 has a main planar portion 96, a pair of legs 98 perpendicular to the planar portion 96, and a bent plate portion 100 also perpendicular to the planar portion 96 and extending in the same direction as the legs 98. Each of the legs 98 is formed with an opening 102 near its distal end and the plate portion 100 is formed with spaced openings corresponding to the spacing of the openings 52 in the plate portion 50 of the cylindrical member 18. The spacing of the openings 102 and the legs 98 is the same as the spacing between the openings 60 in the bent plate 58 of the cylindrical member 18. Accordingly, screws (not shown) may be utilized to secure the cover 94 to the cylindrical member 18 so as to cover the gap 48 while still providing room for the conduits 44 to exit the guide members 56.

Figure 7:
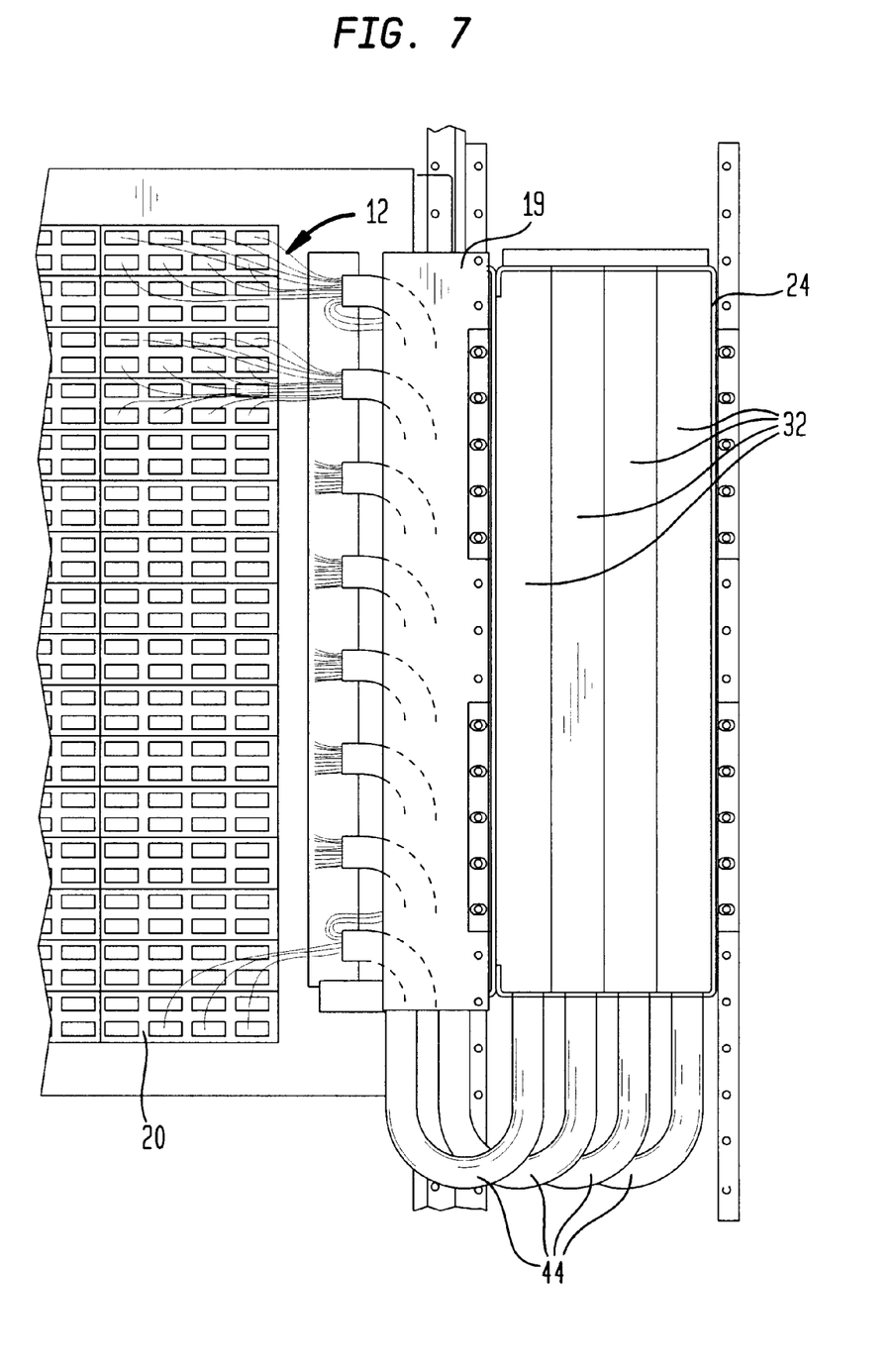
FIG. 7 is an enlarged front view showing the cables routed in and out of the cylindrical member.

Before being installed in the conduits 44, the fibers 12 had been terminated by connectors 104. As is clear from FIGS. 7 and 8, after the conduits 44 are installed in the cylindrical member 18, the fibers 12 contained therein are routed to appropriate connectors in the connector panel 20. Spare fibers have their connectors 104 secured to the "dummy" connectors 106 installed in the openings 62 of the bent plate 58.

Figure 9:
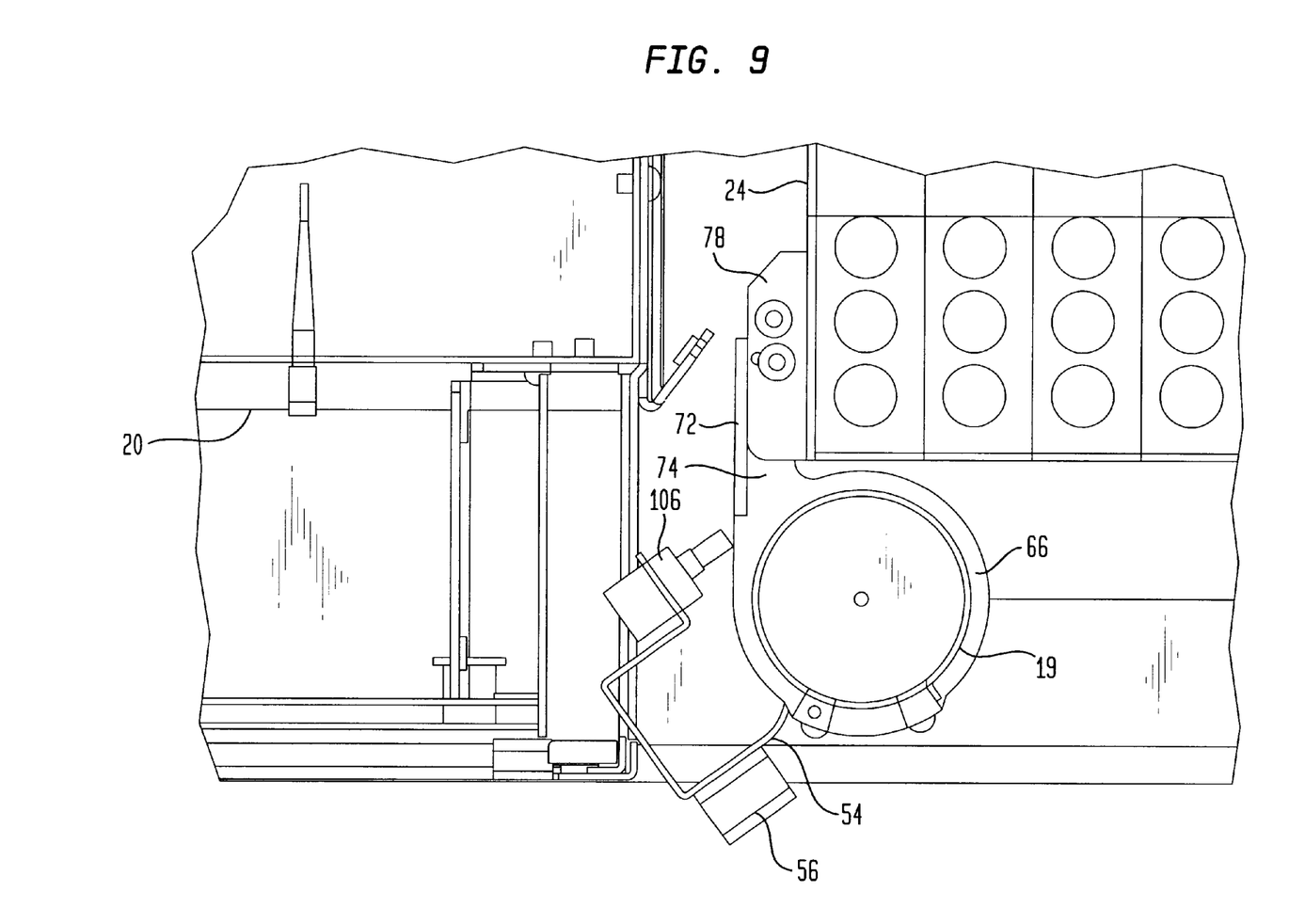
FIG. 9 is a top view showing the cylindrical member pivoted to provide access to a connector panel of the distribution frame.

A feature of the present invention is that when it is desired to gain access to the connector panel 20 for maintenance or removal thereof, each cylindrical member 18, 19 is pivoted to the position shown in FIG. 9 after all of the connectors 104 are disconnected so that the connector panel 20 can be removed from the distribution frame.

Accordingly, there has been disclosed improved apparatus for routing cables in a distribution frame. While an illustrative embodiment of the present invention has been disclosed herein, it is understood that various adaptations and modifications to the disclosed embodiment are possible and it is intended that this invention be limited only by the scope of the appended claims.

What is claimed is:

1. Apparatus for routing cables in a distribution frame, comprising:

a planar panel having a plurality of takeup spools with their axes aligned perpendicular to the plane of the panel for the storage of excess lengths of cable; and a hollow cylindrical member mounted for pivoting movement about a pivot axis, the longitudinal axis of the cylindrical member being parallel to the pivot axis, and the cylindrical member having a longitudinally extending gap in its wall;

wherein cables are routed to the panel, are selectively wound on selected ones of the spools, are routed into the cylindrical member, and are routed out of the cylindrical member through the gap.

2. The apparatus according to claim 1 wherein the cylindrical member longitudinal axis is vertical.

3. The apparatus according to claim 2 wherein:

the distribution frame includes a connector panel to which cables routed out of the cylindrical member can be terminated; and the pivot axis is so located that the cylindrical member is movable between a first position blocking removal of the connector panel from the distribution frame and a second position allowing removal of the connector panel from the distribution frame.

4. The apparatus according to claim 3 further comprising:

a plurality of connectors mounted to the cylindrical member;

whereby extra cables not required to be terminated at the connector panel can be terminated at the connectors mounted to the cylindrical member and held thereby.

5. The apparatus according to claim 1 further comprising:

a tray mounted to the distribution frame for sliding movement between a recessed position and an exposed position;

wherein the panel is pivotably mounted to the tray so that when the tray is in its exposed position the panel can be pivoted from a partially exposed position to a fully exposed position.

6. The apparatus according to claim 1 wherein the cylindrical member includes:

a plate extending substantially radially outward from an edge of the gap; and a plurality of cable guide members mounted to the plate.

7. The apparatus according to claim 6 further comprising:
a cover securable to the cylindrical member to overlie the gap and the plurality of cable guide members.

8. The apparatus according to claim 1 further comprising:
a bracket mounted to the distribution frame for pivoting movement about the pivot axis, the bracket including a pair of spaced circular rings adapted to each encircle a respective end of the cylindrical member; and
a pair of retaining clips each securable to a respective one of the bracket rings and to a respective end of the cylindrical member to securely hold the cylindrical member to the bracket and prevent both rotation and longitudinal movement of the cylindrical member with respect to the bracket.

* * * * *